United States Patent
Baur et al.

(10) Patent No.: US 8,835,062 B2
(45) Date of Patent: Sep. 16, 2014

(54) ENCLOSED SEPARATOR UNIT FOR A GAS SUPPLY OF A FUEL CELL SYSTEM

(75) Inventors: Thomas Baur, Weilheim (DE); Werner Englert, Leingarten (DE); Dietmar Mirsch, Kirchheim (DE); Hans-Joerg Schabel, Oberboihingen (DE)

(73) Assignee: Daimler AG, Stuttgart (DE)

( * ) Notice: Subject to any disclaimer, the term of this patent is extended or adjusted under 35 U.S.C. 154(b) by 913 days.

(21) Appl. No.: 12/665,622

(22) PCT Filed: May 15, 2008

(86) PCT No.: PCT/EP2008/003892
§ 371 (c)(1),
(2), (4) Date: May 11, 2010

(87) PCT Pub. No.: WO2008/154990
PCT Pub. Date: Dec. 24, 2008

(65) Prior Publication Data
US 2010/0221618 A1    Sep. 2, 2010

(30) Foreign Application Priority Data

Jun. 20, 2007 (DE) .......................... 10 2007 028 298

(51) Int. Cl.
*H01M 8/06* (2006.01)
*H01M 8/04* (2006.01)
*H01M 8/10* (2006.01)

(52) U.S. Cl.
CPC ............ *H01M 8/04164* (2013.01); *Y02E 60/50* (2013.01); *H01M 8/04253* (2013.01); *Y02T 90/32* (2013.01); *H01M 8/0606* (2013.01); *H01M 2250/20* (2013.01); *H01M 2008/1095* (2013.01)

USPC ............ 429/410; 429/408; 429/414; 429/415

(58) Field of Classification Search
USPC ......... 429/410, 414, 415, 429, 433, 434, 435, 429/408, 436, 120
IPC ....................................................... H01M 08/06
See application file for complete search history.

(56) References Cited

U.S. PATENT DOCUMENTS

2002/0146602 A1    10/2002   Abe et al.
2003/0129472 A1    7/2003    Fukuma et al.
(Continued)

FOREIGN PATENT DOCUMENTS

DE    101 26 665 A1    12/2002
DE    102 16 953 B4    11/2003
(Continued)

OTHER PUBLICATIONS

Form PCT/ISA/220 and Form PCT/ISA/210 (three (3) pages).
(Continued)

*Primary Examiner* — Basia Ridley
*Assistant Examiner* — Heng Chan
(74) *Attorney, Agent, or Firm* — Crowell & Moring LLP

(57) ABSTRACT

An enclosed separator unit for incorporation into a gas supply device of a fuel cell system, to separate liquid from the gas supply device, includes a separator for separating the liquid. A housing encloses the separator unit which is arranged in a gas space 21 in the housing and/or is in thermal contact with the gas space. A line system is provided for discharging the liquid from the separator, and at least one fluid dynamically active functional component is arranged in the line system, in the gas space 21.

9 Claims, 2 Drawing Sheets

(56) References Cited

U.S. PATENT DOCUMENTS

| | | |
|---|---|---|
| 2003/0232231 A1 | 12/2003 | Stute et al. |
| 2004/0005487 A1 | 1/2004 | Matoba |
| 2007/0237996 A1 | 10/2007 | Kindervater et al. |
| 2008/0075992 A1 | 3/2008 | Fujita et al. |

FOREIGN PATENT DOCUMENTS

| | | | | |
|---|---|---|---|---|
| JP | 04-306566 A | | 10/1992 | |
| JP | 8-273689 A | | 10/1996 | |
| JP | 08273689 A | * | 10/1996 | .............. H01M 8/04 |
| JP | 11-102720 A | | 4/1999 | |
| JP | 2002117876 A | * | 4/2002 | .............. H01M 8/04 |
| JP | 2002-313389 A | | 10/2002 | |
| JP | 2003-203661 A | | 7/2003 | |
| JP | 2004-39526 A | | 2/2004 | |
| JP | 2004-172025 A | | 6/2004 | |
| JP | 2005-32602 A | | 2/2005 | |
| JP | 2005-32673 A | | 2/2005 | |
| JP | 2006-286544 A | | 10/2006 | |
| WO | WO 2006/032359 A2 | | 3/2006 | |
| WO | WO 2006/032359 A3 | | 3/2006 | |

OTHER PUBLICATIONS

Form PCT/ISA/237 (five (5) pages).
International Search Report dated Sep. 25, 2008 (two (2) pages).
Japanese Office Action dated Jul. 11, 2012 (four (4) pages).
Notification of Reason for Refusal Dated May 28, 2013 w/partial English translation (three (3) pages).
Decision to Grant a Patent dated Jan. 14, 2014 w/partial English translation (four (4) pages).

* cited by examiner

ENCLOSED SEPARATOR UNIT FOR A GAS SUPPLY OF A FUEL CELL SYSTEM

This application is a national stage of PCT International Application No. PCT/EP2008/003892, filed May 15, 2008, which claims priority under 35 U.S.C. §119 to German Patent Application No. 10 2007 028 298.4, filed Jun. 20, 2007, the entire disclosure of which is herein expressly incorporated by reference.

BACKGROUND AND SUMMARY OF THE INVENTION

The invention relates to an enclosed separator unit for incorporation into a gas supply of a fuel cell system, for separating liquid from the gas supply. The separator unit has a housing and a separator that is enclosed in and/or in thermal contact with, a gas space in the housing. It also has a line system for draining the liquid away from the separator.

Fuel cell systems of this type are used as mobile energy sources for example in vehicles. The mode of operation of the fuel cell systems is based on the fact that electrical energy is generated by an electrochemical reaction of a fuel (for example, hydrogen) with an oxidant (for example, ambient air), or conversion from the chemical energy of the hydrogen.

To implement the electrochemical process, fuel cell systems conventionally comprise a cathode area, an anode area and a membrane arranged between these areas. The fuel is passed through the anode area and the oxidant is passed through the cathode area, the membrane being permeable to ion migration which takes place in the process. It has become apparent that, in operation, the membrane must be kept at a defined humidity, so that it does not suffer premature wear. Accordingly, water management components are provided in both the anode and cathode gas supply, to ensure that the humidity on both sides of the membrane is kept at the desired level.

A water management component which is often used is separator unit, which is incorporated into the anode gas supply, means. This separator unit has the task of separating excess water—or more generally liquid—out of the anode gas supply means.

German Patent Document DE 102 16 953, for example, discloses a supply device for a fuel cell stack in which a condenser is provided in the cathode gas supply for separating water from the exhaust air originating from the fuel cell. This document does not address the structural design and arrangement of the condenser.

One object of the present invention is to improve the operating reliability of a fuel cell system, taking particular account of the gas supply.

This and other objects and advantages are achieved by the enclosed separator unit according to the invention, which is suitable and/or constructed for incorporation into a gas supply, (preferably an anode gas supply or a cathode gas supply) of a fuel cell system. The fuel cell system is preferably mobile, and in particular is designed for use in vehicles. It comprises one or more fuel cell stacks, which have a plurality of fuel cells (preferably, more than 100 fuel cells per fuel cell stack) each of which comprises a cathode and an anode area separated by a membrane (e.g., PEM).

The fuel cell system may optionally comprise a refuelable tank or a reformer for providing the fuel, in particular hydrogen.

The separator unit, which is suitable and/or constructed for separating liquid from the gas supply, comprises a separator, preferably in the form of a condenser, which separates the liquid from a gas stream. The separator is enclosed in a housing, which likewise forms a constituent part of the separator unit, the separator being placed in a gas space located inside the housing and/or being in thermal contact with this gas space. Preferably, the gas space is sealed in a liquid-tight and/or gas-tight manner relative to the surrounding environment by the housing. The housing is preferably smaller than ten times the volume of the separator, in particular smaller than five times this volume, in particular smaller than three times this volume. Preferably, a level sensor is arranged on the separator, which sensor measures the height of the liquid collected in the separator. The level sensor is preferably likewise positioned in the housing and/or in the gas space.

To drain away the liquid, the separator unit has a line system which is constructed for example with an ejector for draining the liquid into the environment, into a storage tank for liquids or into a humidifier for humidifying the working gases, i.e. the fuel and the oxidant.

According to the invention, the enclosed separator unit may comprise at least one fluid dynamically active functional component which is arranged in the line system (in particular is connected for flow), and which is arranged in the gas space (i.e., in the housing of the separator unit).

In the invention it was identified that the operating reliability of fuel cell systems (particularly their gas supply systems), is also heavily influenced by environmental conditions. At ambient temperatures of below 0° C. in particular, components in the gas supply means tend, to freeze or ice up, which may severely impair the functionality and thus the operating reliability of the gas supply and ultimately of the entire fuel cell system.

In order to achieve in particular a frostproof gas supply design, it is now proposed according to the invention to arrange the separator together in a common housing with at least one further fluid dynamically active functional component of the line system for draining away the liquid. With this arrangement the media stream of the gas supply, which passes through, the separator is used to introduce heat into the separator unit, and thus the temperature of both the separator and the at least one fluid dynamically active functional component is adjusted by means of the media stream.

In a preferred embodiment of the invention, the further functional component takes the form of a valve and/or a filter, preferably a drain valve and/or a drain filter, which respectively controls or filters the outflow of liquid from the separator. It is precisely these two functional components, which in some configurations are located in the line system between separator and exhaust, that (due to their installation position) are subject to the risk of freezing or icing up at temperatures of below 0° C. Due to the arrangement according to the invention of these functional components in the actively or passively heated, or temperature-adjusted, installation space, this risk is markedly reduced or even ruled out In an advantageous further embodiment of the invention, one or more heating devices are incorporated in the housing. Heating devices are preferably understood to mean active heating devices, which provide heat by converting external energy, or passive heating devices, which provide heat using heat exchangers.

In a possible alternative embodiment of the heating device according to the invention, a portion of the cooling water circuit of the fuel cell system is passed through the housing and/or a heat exchanger is incorporated into the housing which is in thermal contact with the cooling water circuit. Once the cooling liquid of the cooling water circuit displays a temperature of above 0° C. (at the latest a short time after start up of the fuel cell system), the temperature of the gas space and thus of the functional components in the gas space may be adjusted as a result of thermal coupling between housing and cooling water circuit.

In another alternative embodiment, the heating device is an electrical heating device, preferably in the form of a cartridge heater. It is particularly preferable for the cartridge heater to be arranged in the gas space directly adjacent the functional component(s).

In a further alternative embodiment, the heating device constitutes a portion of the anode gas supply (particularly the purge branch thereof), some of which portion extends through the housing of the separator unit. Alternatively, a heat exchanger may also be incorporated into the housing which is in thermal contact with the anode gas supply means, particularly the purge branch.

The stated heating devices may be used during start-up or during operation below 0° C. to thaw or keep liquid condensed—out water, particularly in the area of thawed surfaces.

In a preferred further embodiment of the invention, at least one further fluid dynamically active functional component is incorporated into the housing and/or into the gas space of the housing. In this instance, advantage is taken of the fact that not only functional components which are constituent parts of the line system for draining the liquid away from the separator but also other functional components may have their temperature adjusted by incorporation into the housing or into the gas space.

It is particularly preferred in this case that the further functional components comprise constituent parts of the anode gas supply (particularly a constituent part of a or the purge branch of the anode gas supply). Since the media stream in the anode gas supply means has to be kept at a high temperature (for example, around 80° C.), the temperature of the separator or said functional components of the line system may be adjusted by incorporating the functional components into the housing, or—if an additional heating device is provided the temperature of the functional components of the anode gas supply means may be adjusted by the additional heating device together with the separator and the functional components of the line system.

In accordance with this concept, in a preferred further embodiment of the invention, the further functional components take the form of valves and/or filters of the purge branch, thus of purge valves and/or purge filters.

In addition to the above possibilities for implementing a heating device, the heating device may be constructed and/or arranged for direct heating of the purge branch, the heating device preferably taking the form of an electrical heating device.

In a particularly preferred structural embodiment of the invention, the functional components are arranged such that, when the separator unit is installed, liquids remaining in the intake of the functional components (particularly in the intake of the drain valve and/or of the drain filter) flow back into the separator under the effect of gravity.

Alternatively or in addition, the portion of the anode gas supply, the purge branch, the purge valve and/or the purge filter, is/are arranged such that, in the idle state, residual liquid flows back into the anode gas supply, in particular into a main branch of the anode gas supply means.

In order to assist the liquids to flow back in areas at less risk of frost, the liquid-conveying surfaces of the functional elements are preferably provided with a repellent, preferably a hydrophobic coating, which assists the liquid to run off.

Other objects, advantages and novel features of the present invention will become apparent from the following detailed description of the invention when considered in conjunction with the accompanying drawings.

DETAILED DESCRIPTION OF THE DRAWINGS

Figure 1:
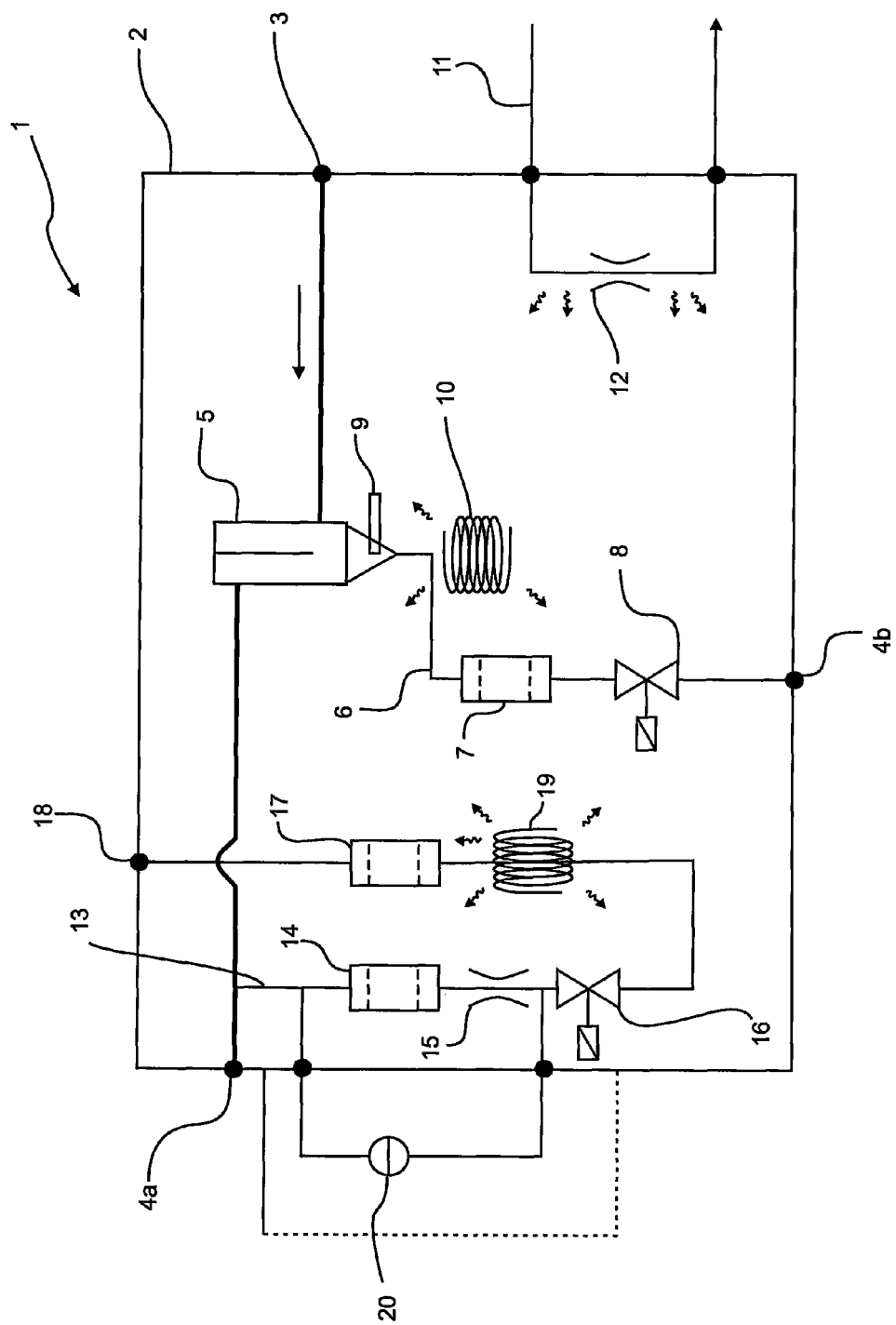
FIG. 1 is an operational diagram of an exemplary embodiment of the invention.

FIG. 1 shows an operational diagram for a separator unit 1 as an exemplary embodiment of the invention. The separator unit 1 is part of an anode gas supply for a fuel cell system, as used for example as a mobile energy source in a vehicle.

The separator unit 1 is enclosed in a housing 2, which is inserted as an independent assembly into the fuel cell system (not shown) or into the anode gas supply (not shown).

In the simplest possible embodiment, the separator unit 1 comprises the housing 2, an inlet connection 3 for incorporating the separator unit 1 into a recirculation line of the anode gas supply of the fuel cell system (the recirculation line leading from 'an anode outlet to an anode inlet of the fuel cell system) an outlet 4a, and a separator 5, which is arranged for flow between inlet 3 and outlet 4a.

The separator 5 serves to dehumidify the gas flowing through the recirculation line, liquid being coupled out of the anode gas supply means by the separator 5. The separator 5 is connected to a line system 6, via which the separated liquid is conveyed to a liquid outlet 4b, which is or may be connected for example to an exhaust or the like. Fluid dynamically active functional components in the form of a drain filter 7 and a drain valve 8 are inserted into the line system 6, for filtering the coupled-out liquid or controlling disposal thereof.

In addition, a level sensor 9 is arranged on the separator 5, which measures the liquid level of the liquid separated in the separator 5. The signal of the level sensor 9 is used, for example, to actuate the drain valve 8. Simply by incorporating separator 5, drain filter 7 and drain valve 8 into the housing 2, it is ensured that the temperature of the stated functional components is adjusted by the media stream of the anode gas supply means flowing through via the inlet 3 and the outlet 4a. As a result, these functional components are protected from freezing when in operation, or are thawed immediately upon start-up of the fuel cell system.

It is possible as a first option additionally to incorporate a cartridge heater 10, which actively adjusts the temperature of the interior of the housing 2, particularly in the area of the drain filter 7, of the drain valve 8 and/or of the level sensor 9, by converting electrical energy.

As a further or alternative option it is possible for a portion of the cooling water line 11 to be looped through the housing 2 of the separator unit 1. The cooling liquid of the cooling water circuit 11 is heated in the shortest possible time when the fuel cell system is in operation, such that thermal energy is output into the inside of the housing 2 via a heat exchanger (not shown), and in this way the temperature of the interior of the housing 2 (and thus of the functional components) may be adjusted. Optionally, a throttle 12 is provided in the portion of the cooling water circuit 11 extending in the housing 2, in order to limit the flow rate through the housing 2.

As a further embodiment, at least one portion of a purge line 13 is incorporated into the housing 2. The purge line 13 serves to eject some of the gas from the anode gas supply in a controlled manner in the event of contamination of the anode gas supply. To this end, the purge line 13 branches off in the housing 2 from the connecting line between outlet 4a and separator 5, and passes via a first filter 14, a throttle 15, a purge valve 16 and then via a second filter 17 to a purge outlet 18. The purge outlet 18 is connected to the exhaust, for example, to eject the anode gas into the environment or to an inlet into the cathode area of the fuel cell system. Because the warmed-up anode gas is passed in a loop in the purge line 13 through the housing 2, thermal energy is additionally introduced into the housing 2, such that the temperature of the functional components, drain filter 7, drain valve 8 and/or level sensor 9, is adjusted. The purge line 13, however, is used only during purging, and in the least favorable case also tends towards freezing or icing up. Incorporating the purge line 13 (in particular the filters 14, 17 and the purge valve 16) into the housing 2 ensures that these further functional components are kept at the same or a similar temperature level as the above-stated functional components and are protected from freezing or icing up.

As a further option, a second cartridge heater 19 may be provided, which is arranged in the area of the purge line 13 upstream of the second filter 17.

Optionally, a differential pressure sensor 20 is likewise a constituent part of the separator unit 1. The differential pressure sensor 20 may likewise be incorporated into the housing 2, as is shown in FIG. 1 by the dotted line illustrating a housing extension.

In a particularly preferred implementation of the operational diagram in FIG. 1, the cartridge heater 10 is arranged in such a way that the drain valve 8 is heated and additionally heat conduction results in heating of the lower part of the separator 5, which may therefore thaw more rapidly. In addition to electrical heating by the cartridge heater 10, the lower part of the separator 5 is heated in particular by the cooling water of the cooling water line 11.

Figure 2:
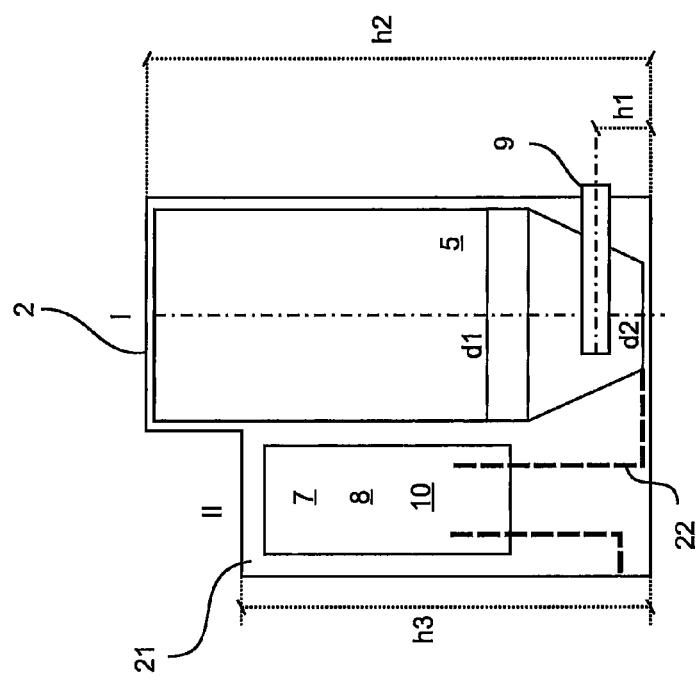
FIG. 2 is a schematic representation of the exemplary embodiment of FIG. 1 in side view.
Figure 3:
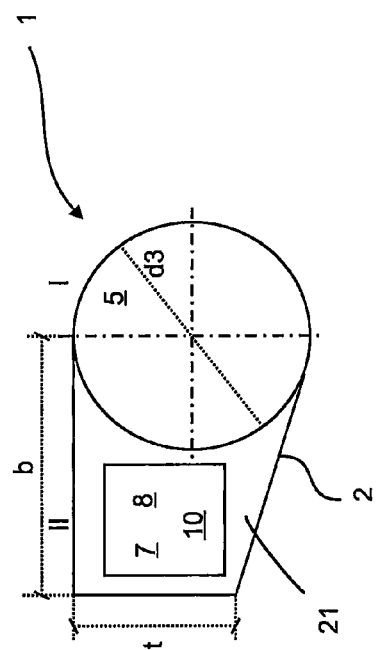
FIG. 3 shows the exemplary embodiment of FIG. 2 in a schematic plan view.

FIG. 2 is a schematic representation in side view of a possible structural implementation of the separator unit 1 in FIG. 1, in the installed position. FIG. 3 shows schematic plan view of the device of FIG. 2.

In the side view of FIG. 2, the housing 2 may be roughly subdivided into two sub-areas, the separator 5 being incorporated into a first sub-area I disposed on the right in FIG. 2, and being of rectangular construction when viewed from the side. The separator 5 has a diameter d1 in the upper area of approx. 85 mm, for example, and at the lower end a diameter d2 of approx. 40 mm. The level sensor 9 is arranged approximately at a height h1 of 20 mm, the entire conical area has a height of approx. 45 mm.

A second sub-area II of the housing 2 adjoins the left-hand side of the first sub-area and is likewise of rectangular construction when viewed from the side. The two subareas I, II are connected together openly and over a large area, such that they together form a common gas space 21. The sub-area I has a height h2 of approx. 185 mm, whereas the sub-area II has a height h3 of approx. 150 mm. In the second sub-area II the functional components are arranged, in particular the drain filter 7, the drain valve 8 and the cartridge heater 10. The cartridge heater 10 is positioned in such a way that on the one hand the drain valve 8 and on the other hand the lower area of the separator 5 are heated. As is clear from the illustration, the functional components are arranged in such a way that, in the idle state, liquid located in the intake 22 from the separator 5 to the functional components 7 and 8 flows back into the separator 5. This behavior may be assisted by, a repellent coating (in particular, a hydrophobic coating) on the liquid conveying areas of drain filter 7, drain valve 8 or inflow 22.

FIG. 3 shows the arrangement of FIG. 2 in a schematic plan view from above, and reveals that the first sub-area I is of circular cross-section and has a diameter d3 of approx. 90 mm. The second sub-area II has a depth at its free end of approx. 60 mm and a width b up to a section line through the center of the sub-area II of approx. 100 mm.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Separator unit
2 Housing
3 Connection, inlet
4a Outlet of anode gas line
4b Liquid outlet
5 Separator
6 Line system
7 Drain filter
8 Drain valve
9 Level sensor
10 Cartridge heater
11 Cooling water line
12 Throttle
13 Purge line
14 First filter
15 Throttle
16 Purge valve
17 Second filter
18 Purge outlet
19 Second cartridge heater
20 Differential pressure sensor
21 Gas space
22 Intake

The invention claimed is:

1. An enclosed separator unit for separating liquid from a gas supply device of a fuel cell system, said separator unit comprising:
  a separator for separating the liquid;
  a housing which encloses the separator, with the separator being arranged in a gas space in the housing and/or being in thermal contact with said gas space;
  a line system for draining the liquid away from the separator;
  at least one fluid dynamically active functional component arranged in the line system, in the gas space; and
  a heating device incorporated into the housing;
  wherein, the heating device comprises at least one of i) a portion of a cooling water circuit of the fuel cell system and ii) an electrical heating device,
  wherein the housing includes an inlet coupled to an outlet of an anode of the fuel cell system, an outlet coupled to an inlet of the anode of the fuel cell system, and a purge outlet,
  wherein a line passes from the separator to the housing outlet and a purge line branches off from the line and connects to the purge outlet, and
wherein the purge line is arranged in the housing in such a manner as to introduce thermal energy into the housing.

2. The separator unit according to claim 1, wherein the functional component comprises at least one of a drain valve and a drain filter.

3. The separator unit according to claim 1, wherein the heating device comprises a portion of an anode gas supply device of said fuel cell system.

4. The separator unit according to claim 1, further comprising at least one additional fluid dynamically active functional component, which is incorporated into at least one of the housing and the gas space.

5. The separator unit according to claim 4, wherein, the additional functional component comprises a constituent part of an anode gas supply device.

6. The separator unit according to claim 4, wherein the additional functional component comprises at least one of a purge valve and a purge filter.

7. The separator unit according to claim 1, wherein the heating device is disposed for direct heating of the purge branch line.

8. The separator unit according to claim 4, wherein at least one of the functional component and the at least one additional functional component is arranged in at least one of the housing and the gas space, whereby wherein, in an installed but idle state, liquid in an intake to the functional components flows back into at least one of the separator and the gas supply device.

9. The separator unit according to claim 8, wherein liquid-conveying surfaces of the functional components are provided with at least one of a water-repellent and a hydrophobic coating.

* * * * *